United States Patent [19]

Shimizu

[11] Patent Number: 5,463,474

[45] Date of Patent: Oct. 31, 1995

[54] PILOT SIGNAL ELIMINATING CIRCUIT

[75] Inventor: Shigeru Shimizu, Kanagawa, Japan

[73] Assignee: Sony Corporation, Tokyo, Japan

[21] Appl. No.: 293,743

[22] Filed: Aug. 22, 1994

Related U.S. Application Data

[63] Continuation of Ser. No. 83,193, Jun. 25, 1993, abandoned, which is a continuation of Ser. No. 695,898, May 6, 1991, abandoned.

[30] Foreign Application Priority Data

May 9, 1990 [JP] Japan ..................................... 2-117470

[51] Int. Cl.$^6$ ...................................................... H04N 9/79
[52] U.S. Cl. ............................................. 358/310; 358/323
[58] Field of Search ..................................... 358/310, 318, 358/319, 312, 323, 320, 324, 325, 342, 322, 337, 328, 327, 329; 348/607, 606, 614, 533, 535; 360/36.1, 37.1

[56] References Cited

U.S. PATENT DOCUMENTS

| | | | |
|---|---|---|---|
| 4,490,750 | 12/1984 | Yoshinaka | 358/320 |
| 4,613,912 | 9/1986 | Shibata et al. | 360/19.1 |
| 4,807,048 | 2/1989 | Yasuda | 358/310 |
| 4,809,085 | 2/1989 | Funahashi | 358/329 |
| 4,823,198 | 4/1989 | Okumura | 358/311 |
| 4,870,507 | 9/1989 | Ahn et al. | 358/316 |
| 4,998,172 | 3/1991 | Kitazawa et al. | 358/328 |
| 5,005,081 | 4/1991 | Asano | 358/167 |

FOREIGN PATENT DOCUMENTS 0311117  4/1989  European Pat. Off. ......... H04N 9/83

OTHER PUBLICATIONS

Patent Abstracts of Japan, vol. 12, No. 72 (E-588) 5 Mar. 1988 & JP-A-62 214 797 (Sony Corporation) 21 Sep. 1987, abstract.

Patent Abstracts of Japan, vol. 7, No. 186 (E-193) 16 Aug. 1983 & JP-A-58 090 880 (Matsushita Denki Sangyo KK) 30 May 1983, abstract.

Patent Abstracts of Japan, vol. 13, No. 435 (E-825) 28 Sep. 1989 & JP-A-01 162 497 (Matsushita Electric Ind Co) 26 Jun. 1989, abstract.

Patent Abstracts of Japan, vol. 10, No. 60 (P-435) 11 Mar. 1986 & JP-A-60 201 554 (Hitachi Seisakusho KK) 12 Oct. 1985, abstract.

IEEE Transactions on Consumer Electronics, vol. 30, No. 4, 30 Nov. 1984, New York US pp. 568–573; A. Shibata et al.: 'The new chroma signal recording system for 8mm video', p. 568, right column, line 4–line 8.

*Primary Examiner*—Tommy P. Chin
*Assistant Examiner*—Robert Chevalier
*Attorney, Agent, or Firm*—Jay H. Maioli

[57] ABSTRACT

A pilot signal eliminating circuit for eliminating pilot signals from chrominance signals as part of video signals recorded on a magnetic recording medium. The pilot signals have different frequencies from one track to another neighboring track on the magnetic recording medium, and are previously superimposed on the chrominance signals, which in turn are previously changed to a lower frequency range. The circuit includes a frequency converter for shifting the frequency of the chrominance signals to a higher frequency range, a pilot signal take-out circuit for taking out the pilot signals by subtracting an output signal of the frequency converter delayed by one field from an undelayed output signal of the frequency converter and a subtraction circuit for subtracting an output of the pilot signal take-out circuit from an output of the frequency converter,

4 Claims, 3 Drawing Sheets

PILOT SIGNAL ELIMINATING CIRCUIT

This is a continuation of application Ser. No. 08/083,193, now abandoned filed Jun. 25, 1993, which was a continuation of application Ser. No. 07/695,898, now abandoned, filed May 6, 1991, now abandoned.

BACKGROUND OF THE INVENTION

Field of the Invention

This invention relates to a circuit for eliminating pilot signals having different frequencies between adjacent tracks on a magnetic recording medium from the chrominance signal which has been shifted to a lower frequency range and on which the pilot signals have been superimposed.

Description of the Prior Art

There is known a recording and/or reproducing apparatus having a format in which pilot signals having different frequencies between two adjacent tracks on a magnetic recording medium are recorded in superimposition on a video signal by frequency multiplexing, as typified by a so-called 8 mm video tape recorder (VTR). The frequency chart on the 8 mm VTR format is as shown in FIG. 1, wherein recorded signals are composed of frequency modulated audio signals (AFM signals), video signals formed by chrominance signals shifted to a lower frequency range (C signals) and luminance signals (Y signals), and the pilot signals superimposed on the video signals.

The pilot signals are formed by four pilot signals $P_1$, $P_2$, $P_3$ and $P_4$, having different frequencies $f_1$, $f_2$, $f_3$ and $f_4$ respectively. Each of the pilot signals $P_1$, $P_2$, $P_3$ or $P_4$ is recorded on one track tr, as shown in FIG. 2, so that the pilot signals recorded on adjacent tracks tr on the 8 mm video tape T are not of the same frequency, in such a manner that, at the time of signal reproduction, tracking control may be made on the basis of the pilot signals read out on the track-by-track basis.

However, when the video signals recorded with the above described format on the track tr are directly reproduced and displayed on a television screen, the pilot signals superimposed on the video signals, more specifically, on the chrominance signals, shifted to the side of the lower frequency will appear as oblique beats on the screen.

In order to overcome such inconvenience, a trap circuit 111 is introduced into a chrominance signal processing circuit 110, as shown in FIG. 3, for eliminating the pilot signals.

In this figure, signals reproduced from the tracks tr on the 8 mm video tape T by a magnetic bead 100 on the track-by-track basis are transmitted by means of an amplifier 101 to a processing system for luminance signals (Y signals) 120 and to a processing system for chrominance signals (C signals) 110. The reproduced signals transmitted to the processing system 120 are freed of the Y signals by a high-pass filter (HPF) 121 having the frequency band not lower than that for the Y signals as the passband, and are gain-adjusted at an automatic gain adjustment circuit (AGF) 122 so as to be transmitted at a terminal 124 to a downstream side circuitry, not shown, of the processing system for luminance signals 120. On the other hand, the reproduced signals transmitted to the processing system for chrominance signals 110 are first processed by a trap circuit 111, whereby the frequency ranges of the pilot signals Ps and the AFM signals contained in the reproduced signals are removed. The chrominance signals, shifted to the lower frequency range, are taken out from the output of the trap circuit 111 by a low-pass filter(LPF) 112 having the frequency range not higher than that of the chrominance signals shifted to the lower frequency range as the passband, and are gain-adjusted at an automatic color control circuit (ACC) 113 for chrominance signals, so as to be transmitted at a terminal 114 to a downstream side circuitry, not shown, of the chrominance signal processing system 110.

However, if the pilot signals Ps are removed, simultaneously with the AFM signals, by trap circuit 111, the frequency range of the chrominance signals shifted to the low frequency range, is diminished by an amount equal to the frequency range allocated to the pilot signals $P_1$ to $P_4$, as a result of the frequency band rejection by the trap circuit 111. This means that the picture displayed on the television screen is deteriorated in quality.

OBJECT AND SUMMARY OF THE INVENTION

It is therefore an object of the present invention to provide a pilot signal eliminating circuit for preventing deterioration of the picture quality on the television screen.

It is another object of the present invention to provide a pilot signal eliminating circuit for eliminating the pilot signals without reducing the frequency range for the chrominance signals.

The present invention provides a pilot signal eliminating circuit for eliminating pilot signals having different frequencies between neighboring tracks on the magnetic recording medium from the chrominance signals which have been changed to a lower frequency range and on which the pilot signals have been superimposed. A signal component taken out by subtraction of the supplied frequency-converted signal delayed by one field from the supplied frequency-converted signal not delayed by one field is subtracted from a frequency-converted signal to eliminate the pilot signals without affecting the chrominance signals.

More specifically, the low-range chrominance signal with the pilot signals superimposed thereon is processed by a frequency converter to produce a frequency-converted signal Cp, which signal Cp is delayed by one field and subtracted from the same signal Cp not delayed by one field to take out a pilot signal component P. This signal component is then subtracted from the signal Cp which has been delayed to take the delay resulting from signal processing into account for eliminating the pilot signals without reducing the frequency range of the chrominance signals. Since not only the pilot signal component but also signal components other than the chrominance signals, such as noise signals, may be taken out, the chrominance signal C obtained at the output terminal 2 is also freed of noises.

DETAILED DESCRIPTION OF PREFERRED EMBODIMENT

Figure 1:
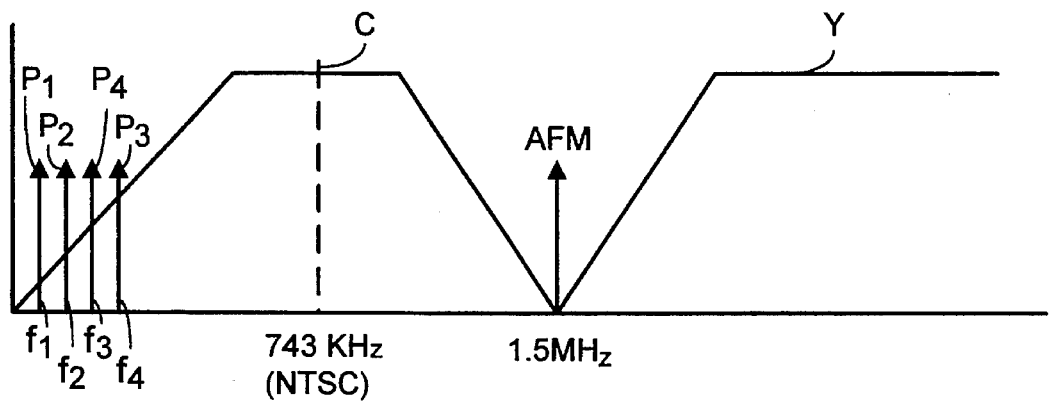
FIG. 1 is a frequency chart on an 8 mm VTR format.
Figure 2:
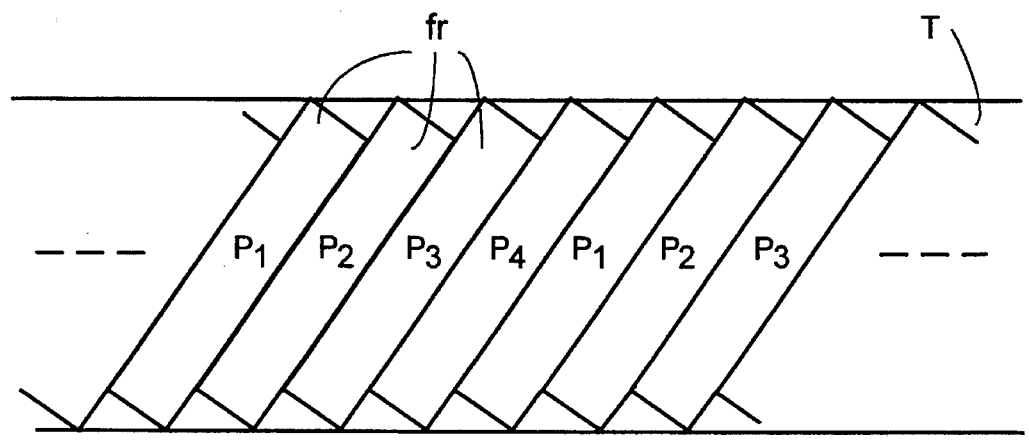
FIG. 2 is a diagrammatic view for illustrating pilot signals recorded on recording tracks of a magnetic recording medium.
Figure 3:
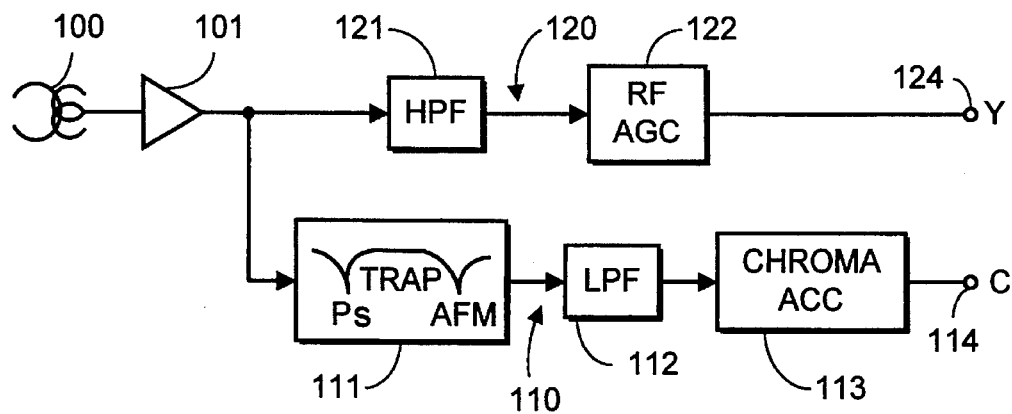
FIG. 3 is a block circuit diagram for illustrating a conventional pilot signal eliminating circuit.

An illustrative embodiment of the present invention will be explained every referring to the drawings.

Figure 4:
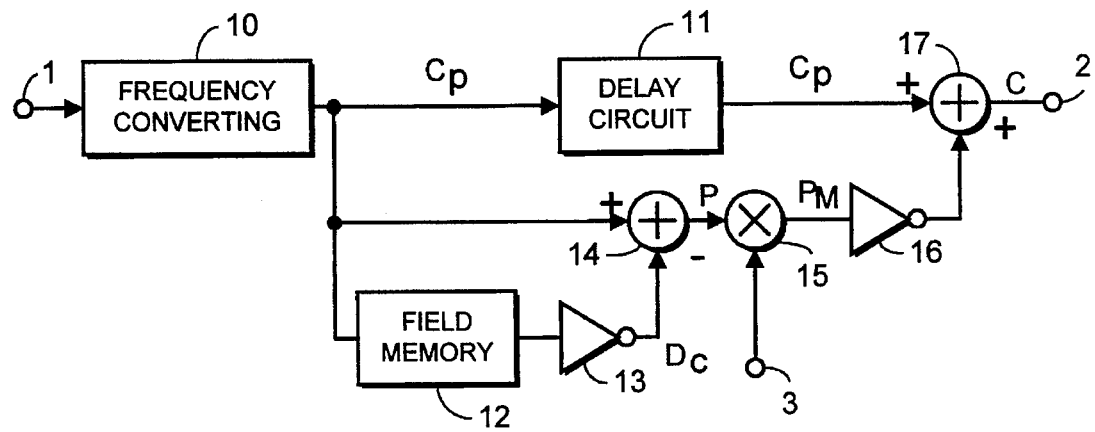
FIG. 4 is a block circuit diagram for illustrating a pilot signal eliminating circuit embodying the present invention.

FIG. 4 shows, in a block circuit diagram, a pilot signal eliminating circuit embodying the present invention.

The pilot signal eliminating circuit shown in FIG. 4 is adapted for eliminating four pilot signals $P_1$ to $P_4$ from digital chrominance signals which have been shifted to a lower frequency range before being inputted to a chrominance signal processing system at an input terminal 1 and on which the pilot signals have similarly been superimposed. The pilot signals $P_1$, $P_2$, $P_4$ and $P_3$, have different frequencies $f_1$, $f_2$, $f_4$ and $f_3$, respectively, from one track to an adjacent track, making one complete cycle by four fields or tracks. The pilot signal eliminating circuit 4 is constituted by a frequency converter 10 for shifting the frequency of the chrominance signals which have been shifted to a lower frequency range and on which the pilot signals have been superimposed, pilot component take-out means, formed by a field memory 12, an inverter 13 and an adder 14, for subtracting a signal delayed by one field from an output signal of the frequency converter 10, from the output signal, for taking out a pilot signal component, and subtraction means, formed by an inverter 16 and an adder 17, for subtracting the output of the pilot component take-out means from the output of the frequency converter 10, that is, adding the output of the pilot component take-out means as a subtraction signal to the output of the frequency converter 10.

Figure 5:
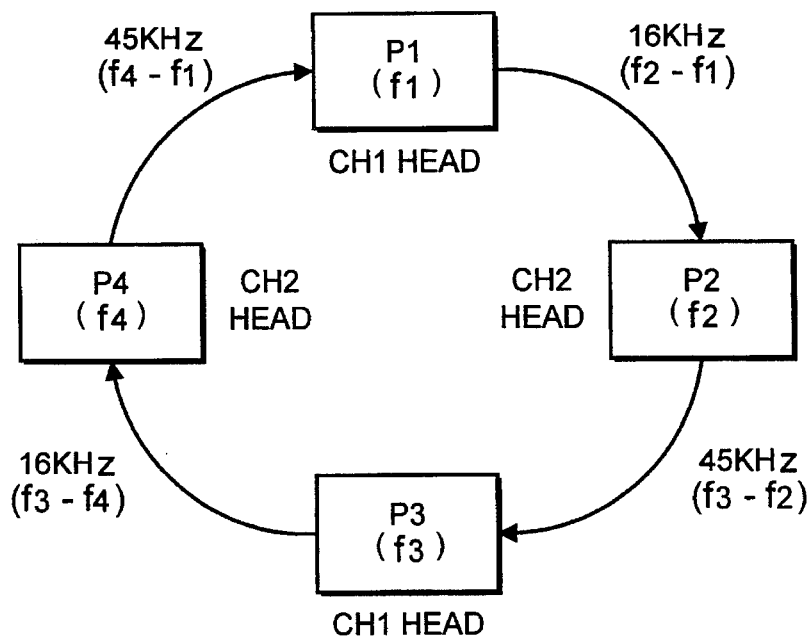
FIG. 5 is a diagrammatic view showing pilot signals making one complete cycle in four fields.

It is noted that, in an 8 mm VTR format, the frequencies of the pilot signals $P_1$, $P_2$, $P_4$ and $P_3$ are so set that the frequency $f_1$ of the pilot signal $P_1$ is 102.544 kHz, the frequency $f_2$ of the pilot signal $P_2$ is 118.951 kHz, the frequency $f_4$ of the pilot signal $P_4$ is 148.689 kHz and the frequency $f_3$ of the pilot signal $P_3$ is 165.210 kHz. Thus, as shown in FIG. 5, these four pilot signals $P_1$, $P_2$, $P_4$ and $P_3$ complete one cycle in four fields or tracks, with the frequency difference between the pilot signals recorded on the adjacent tracks being approximately 16 kHz or 45 kHz. Since the pilot signals are superimposed on the video signals, the pilot signals exist as superimposed signals within the frequency region lower than the lower frequency range to which the chrominance signals have been shifted and which is centered at 743 kHz, Each of the superimposed pilot signals is recorded on each track tr so that the pilot signals are not of the same frequency between the adjacent tracks tr on an 8mm video tape T. Subsequently, during signal reproduction, tracking control is performed on the basis of the pi lot signals alternately read out from the tracks by magnetic heads CH1, CH2 of a rotary magnetic head of the 8 mm VTR, In the present circuit, the pilot signals are changed to a higher frequency range by the frequency converter 10 so as to be taken out at the pilot component take-out means which will be explained subsequently. As a typical example, in order to take the video signal processing to be performed downstream of the present circuit, such as demodulation of the video signals of the NTSC system, into account, the aforementioned frequency conversion or changing by the frequency converter 10 is performed so that the chrominance signals, which have been changed to a lower frequency range centered at 743 kHz, are converted into the chrominance signals having a frequency of 3.58 HHz which is the color subcarrier frequency of the NTSC system. Such frequency conversion is performed with the aid of local oscillation signals having the frequency of 4.32 MHz. If the chrominance signals, which have been changed to the lower frequency ranged, are raised to the higher frequency range by the local oscillation signals with the frequency of 4.32 MHz, the frequency of the pilot signals is concomitantly raised to about 4.2 MHz. When the pilot signals, having the above described different frequencies, are changed to the high frequencies of the order of 4.2 MHz, the relative frequency difference between the pilot signals is significantly reduced, or is reduced substantially to zero. It is to be noted that the chrominance signals, changed to the lower frequency range, may be changed to a frequency for any other television system than that for the aforementioned NTSC system. In such case, processing of frequency changing or conversion which takes the relevant television system into account would be effective in conducting subsequent image signal processing operations.

Figure 6A:
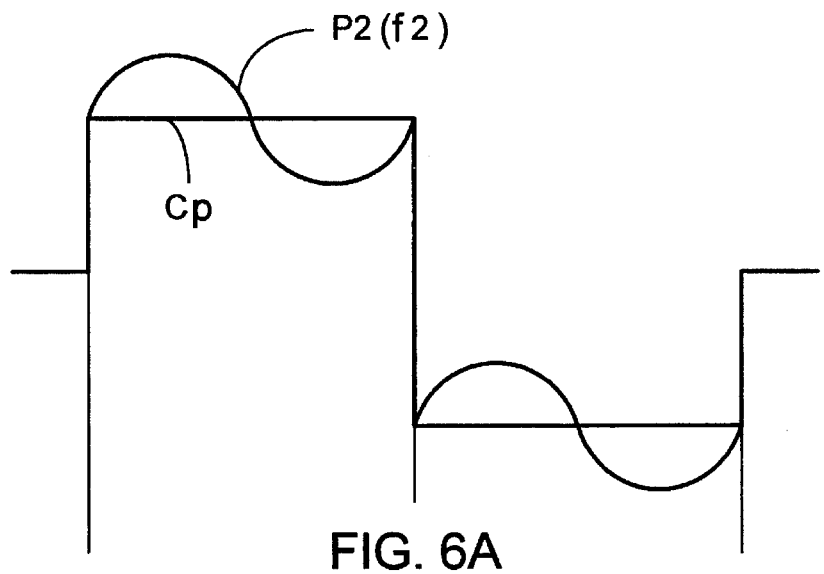
FIG. 6, formed of FIGS. 6(a), 6(b) and 6(c), is a waveform diagram showing signal waveforms outputted at the various points of the pilot signal eliminating circuit shown in FIG. 4.
Figure 6B:
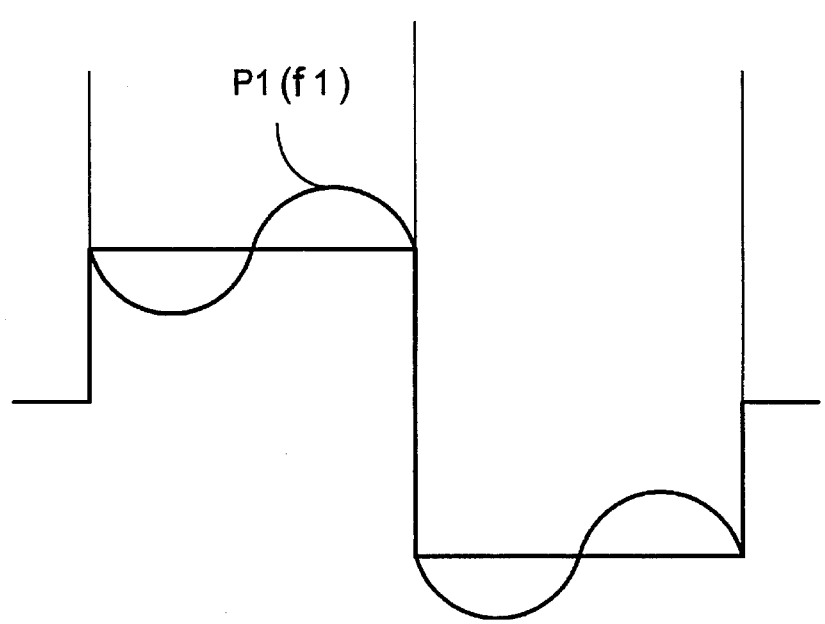

The signals thus changed in the frequency range are transmitted to the pilot signal take-out means. Supposing that the chrominance signal which has been shifted to the lower frequency range and on which the pilot signal $P_2$ having the frequency $f_2$ have been superimposed is supplied to the input terminal 1, the output of the frequency converter 10 is a frequency-converted signal Cp comprising the chrominance signal and the pilot signal $P_2$ superimposed thereon, as shown in FIG. 6(a). Although the chrominance signal and the pilot signal $P_2$, shown in FIG. 6(a), are digital signals, the pilot signal $P_2$ is shown as an analog signal for convenience in explanation. The output of the frequency converter 10 is transmitted to the adder 14 and the field memory 12 of the pilot component take-out means. In the field memory 12, the frequency-converted signal Cp supplied thereto is stored field by field and read out with a one-field delay in the order in which the signal Cp is stored in the memory 12 by way of performing a field-delaying processing operation. Thus the output of the field memory 12 when the frequency-converted signal Cp is supplied to the adder 14 is the signal preceding the signal Cp thus supplied to the adder 14 by one field, that is, the frequency-converted signal Cp which is the chrominence signal on which the pilot signal $P_1$ has been superimposed. It is noted that, while the chrominance signal is inverted in phase from field to field, the pilot signals are not inverted in phase. As a result of the above described frequency conversion, the pilot signals are substantially freed of the relative differences in frequencies, while the pilot signals, such as the pilot signals $P_1$ and $P_2$, are substantially in phase with one another. Thus the output of the field memory 12, when processed by a phase inverter 13 adapted for inverting the signal phase by 180°, becomes a signal Dc as shown in FIG. 6(b), in which only the pilot signal $P_1$ is anti phase with respect to the pilot signal of the frequency-converted signal Cp shown in FIG. 6(a). This signal Dc is supplied as a subtraction signal to the adder 14. Thus a signal is outputted at the adder 14 in which the in-phase chrominance signals cancel each other and removed and which thus is formed only by a pilot signal component P consisting of antiphase pilot signals, or $P=(P_2-P_1)$.

Figure 6C:
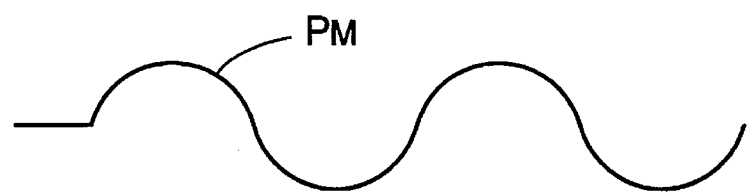

The pilot signal component P thus produced is transmitted by means of a multiplier 15 to the above mentioned subtraction means formed by the inverter 16 and the adder 17. A signal inputted at the input terminal 1, herein the chrominance signal cp on which the frequency-converted pilot signal $P_2$ has been superimposed, is also supplied to the adder 17 by means of a delay circuit 11 adapted for correcting the delay caused at, for example, the above mentioned pilot component take-out means. To the multiplier 15, there is supplied a predetermined multiplication coefficient at a terminal 3 for controlling the signal quantity fed back to the adder 17. The output of the adder 14 is multiplied by the multiplication coefficient to produce a signal Pm as shown for example in FIG. 6(c). The output signal Pm of the multiplier 15 is inverted by the inverter 16 and then supplied to the adder 17, where the output of the inverter 16 is subtracted from the output of the delay circuit 11, in other words, the inverted output of the multiplier 15 is adder to the output of the delay circuit 11. This eliminates the pilot signal $P_2$ from the chrominance signal on which the pilot signal $P_2$ has been superimposed. The chrominance signal C, which has been freed of the pilot signal $P_2$, is transmitted at an output terminal 2 of the present circuit to a downstream side video signal processing system. The above described processing is performed on the reproduced signals from each track of the magnetic recording medium.

Although the present invention has been described with reference to an illustrative embodiment thereof, the present invention may comprise various other modifications and hence may be limited only by the wording of the appended claims.

What is claimed is:

1. A circuit for eliminating pilot signals having different frequencies from one track to another adjacent track on a magnetic recording medium from chrominance signals on which said pilot signals have been superimposed and which have been changed to a lower frequency range, said circuit comprising:

a frequency converting circuit for converting to a higher frequency the frequency of said chrominance signals and said pilot signals superimposed thereon, said converting to a higher frequency reducing the relative frequency differences among said pilot signals;

a field memory directly responsive to an output signal of said frequency converting circuit to produce a delayed output signal in which said chrominance signals are phase inverted relative to said pilot signals;

an inverter for inverting said delayed output signal;

a first subtractor directly responsive to said output signal of said frequency converting circuit and said inverted, delayed output signal for subtracting said inverted, delayed output signal, which contains both chrominance signals and pilot signals, from an undelayed output of said frequency converting circuit, which also contains both chrominance signals and pilot signals, to eliminate said chrominance signals and isolate said pilot signals;

a separate delay circuit in parallel with said field memory, inverter and subtractor for delaying said output signal of said frequency converting circuit by an amount compensating for a delay of said field memory, inverter and subtractor; and a second subtractor for subtracting an output of said first subtractor, which contains only pilot signals, from an output of said separate delay circuit, which contains both chrominance signals and pilot signals, to produce a final output containing only chrominance signals.

2. A circuit according to claim 1 further comprising a multiplier connected between said first and second subtractors for multiplying said output of said first subtractor by a predetermined multiplication coefficient.

3. A circuit according to claim 1 wherein said second subtractor comprises a second inverter for inverting said output of said first subtractor and an adder for adding an inverted output of said second inverter to said compensating output of said separate delay circuit.

4. A circuit according to claim 3 wherein said separate delay circuit is connected between said frequency converting circuit and said adder.

\* \* \* \* \*